United States Patent
Domjan et al.

(10) Patent No.: US 7,430,078 B2
(45) Date of Patent: Sep. 30, 2008

(54) MULTIPLE IMAGING ARRANGEMENTS FOR HEAD MOUNTED DISPLAYS

(75) Inventors: László Domjan, Budapest (HU); Gábor Szarvas, Budapest (HU); Szabolcs Mike, Érd (HU)

(73) Assignee: Headplay (Barbados), Inc., Bridgetown (BB)

( * ) Notice: Subject to any disclaimer, the term of this patent is extended or adjusted under 35 U.S.C. 154(b) by 0 days.

(21) Appl. No.: 11/396,948

(22) Filed: Apr. 3, 2006

(65) Prior Publication Data

US 2006/0245068 A1 Nov. 2, 2006

Related U.S. Application Data

(62) Division of application No. 10/716,192, filed on Nov. 18, 2003, now Pat. No. 7,057,824.

(30) Foreign Application Priority Data

Nov. 19, 2002 (HU) .................................. 0203993

(51) Int. Cl.
*G02B 27/14* (2006.01)
*G02B 27/10* (2006.01)
*G02B 27/28* (2006.01)
*G09G 5/00* (2006.01)

(52) U.S. Cl. .................. 359/630; 359/633; 359/618; 359/494; 359/495; 345/8; 345/9

(58) Field of Classification Search .................. 359/618, 359/629, 630, 632, 633, 636, 494–497; 345/7–9
See application file for complete search history.

(56) References Cited

U.S. PATENT DOCUMENTS 5,029,261 A   7/1991   Koyama et al.
5,035,474 A   7/1991   Moss et al.
5,129,716 A   7/1992   Holakovszky et al.

(Continued)

FOREIGN PATENT DOCUMENTS

EP    0 252 200    1/1988

(Continued)

OTHER PUBLICATIONS

Taiwanese Office Action and the Search Report (English Language Translation) issued for Application No. 092136589, dated Jul. 9, 2007; 3 pages.

(Continued)

*Primary Examiner*—Scott J. Sugarman
*Assistant Examiner*—Jack Dinh
(74) *Attorney, Agent, or Firm*—Fulbright & Jaworski L.L.P.

(57) ABSTRACT

A head mounted display is disclosed that utilizes a single video display screen to transport images to both eyes. Multiple reflections are created by illuminating the display screen form a plurality of directions, or by illuminating the display screen with light beams of differing polarizations. The reflections of the display screen are focused in order to reduce the splitting volume and then redirected by a plurality of reflective surfaces located near the focal point of the display images. Different images may be sent to each eye of a user by interlacing multiple data streams for the display and linking each data stream with a specific illumination direction, or specific polarization.

23 Claims, 7 Drawing Sheets

U.S. PATENT DOCUMENTS

| | | | |
|---|---|---|---|
| 5,392,158 A | 2/1995 | Tosaki | |
| 5,621,572 A | 4/1997 | Fergason | |
| 5,677,628 A | 10/1997 | Watanabe et al. | |
| 5,682,173 A | 10/1997 | Holakovszky et al. | |
| 5,739,955 A | 4/1998 | Marshall | |
| 5,926,318 A | 7/1999 | Hebert | |
| 6,055,109 A | 4/2000 | Hur | |
| 6,094,309 A | 7/2000 | Ophey | |
| 6,111,408 A | 8/2000 | Blades et al. | |
| 6,147,805 A | 11/2000 | Fergason | |
| 6,219,186 B1 | 4/2001 | Hebert | |
| 6,226,076 B1 | 5/2001 | Yoshida | |
| 6,246,383 B1 | 6/2001 | Ophey | |
| 6,246,386 B1 | 6/2001 | Perner | |
| 6,271,808 B1 * | 8/2001 | Corbin | 345/7 |
| 6,417,820 B1 | 7/2002 | Choi et al. | |
| 6,989,935 B2 | 1/2006 | Domjan et al. | |
| 7,053,865 B2 | 5/2006 | Takahashi | |
| 2002/0000951 A1 | 1/2002 | Richards | |
| 2002/0080496 A1 | 6/2002 | Kaschke et al. | |
| 2003/0026586 A1 | 2/2003 | Bruegl et al. | |
| 2004/0150884 A1 | 8/2004 | Domjan | |
| 2004/0150888 A1 | 8/2004 | Domjan et al. | |

FOREIGN PATENT DOCUMENTS

| | | |
|---|---|---|
| GB | 2332533 | 6/1999 |
| HU | 212 134 A | 6/1998 |
| HU | 216 221 B | 5/1999 |
| JP | 5-150182 | 6/1993 |
| JP | 06-110014 | 4/1994 |
| JP | 06-305342 | 11/1994 |
| JP | 10-148789 | 6/1998 |
| JP | 11-295645 | 10/1999 |
| JP | 2000-284215 | 10/2000 |
| SU | 107668 | 8/1950 |
| TW | 175525 | 12/1991 |
| TW | 291987 | 11/1996 |
| TW | 567341 | 12/2003 |
| WO | WO 85/04961 | 11/1985 |
| WO | WO 99/31543 | 6/1999 |
| WO | WO 00/00119 | 1/2000 |
| WO | WO 01/59507 | 8/2001 |

OTHER PUBLICATIONS

PCT Search Report issued for PCT/US2003/39768, dated Apr. 21, 2004.

International Search Report issued for PCT/US2003/39756, dated May 19, 2004.

Hungarian Search Report issued for P0203993, dated Apr. 29, 2004.

Examination Report issued by the Australian Patent Office for AU 2003299615, dated Jun. 8, 2007.

Office Action/Examination Report (with English Language Translation) issued for Russian Application No. 2006124847, dated Aug. 15, 2007; 27 pages.

Office Action or Examination Report (with English Language Translation) issued for Russian Application No. 2006124859, dated Sep. 12, 2007; 13 pages.

Russian Federation Official Action issued Oct. 26, 2007, 9 pgs. (English translation attached).

Russian Office Action, dated Dec. 28, 2007, Decision on Grant Patent for Invention (English translation included), 20 pps.

Russian Office Action issued for Russian Application 2006-124847 (English Translation) dated Mar. 18, 2008, 4 pgs.

* cited by examiner

MULTIPLE IMAGING ARRANGEMENTS FOR HEAD MOUNTED DISPLAYS

CROSS-REFERENCE TO RELATED APPLICATIONS

The present application is a divisional of commonly assigned, U.S. patent application Ser. No. 10/716,192, entitled "MULTIPLE IMAGING ARRANGEMENTS FOR HEAD MOUNTED DISPLAYS", filed Nov. 18, 2003, the disclosure of which is hereby incorporated herein by reference. The present application is related to U.S. Pat. No. 6,989,935, entitled "OPTICAL ARRANGEMENTS FOR HEAD MOUNTED DISPLAYS," the disclosure of which is hereby incorporated herein by reference.

TECHNICAL FIELD

The invention relates generally to visual displays and more specifically to optical arrangements for head-mounted systems that generate multiple images form a single display screen.

BACKGROUND OF THE INVENTION

Head-Mounted Displays (HMDs) are a class of image display devices that can be used to display images from television, digital versatile discs, computer applications, game consoles, or other similar applications. A HMD can be monocular (a single image viewed by one eye), biocular (a single image viewed by both eyes), or binocular (a different image viewed by each eye). Further, the image projected to the eye(s) may be viewed by the user as complete, or as superimposed on the user's view of the outside world. For most HMDs, designs must account for parameters such as image resolution, the distance of the virtual image from the eye, the size of the virtual image (or the angle of the virtual image), the distortions of the virtual image, the distance between the left and the right pupil of the user (inter pupillar distance (IPD)), diopter correction, loss of light from image splitting and transmission, power consumption, weight, and price. Ideally, a single HMD would account for these parameters over a variety of users and be able to display an image would account for these parameters over a variety of users and be able to display an image regardless of whether it was a stereoscopic binocular image or a simple monoscopic binocular image.

If the resolution of a picture on the HMD's internal display is 800×600 pixels, an acceptable size for the virtual image produced by the HMD's optics is a virtual image diameter of approximately 1.5 m (52"-56") at 2 m distance which corresponds to approximately a 36° angle of view. To properly conform to the human head and eyes, the IPD should be variable between 45 mm and 75 mm. In order to compensate for near- and farsightedness, at least a ±3 diopter correction is necessary.

The use of only one microdisplay in the HMD (instead of using one for each eye) drastically reduces the price of the device. Typically, an arrangement for such a unit positions a microdisplay between the user's eyes. The image produced is then split, enlarged, and separately transmitted to each eye. There are numerous designs known in the art for beam splitting in single display HMDs with a center mounted display, but none provide a solution that is cheap, light weight, small in size, and capable of displaying all varieties of images.

Many applications for head mounted systems require that different information be transmitted to a right-eye of a user than is transmitted to a left-eye of a user. For example, to impart to a user a three-dimensional image requires that each eye of the user view a different prospective of the same image. In other applications, such as a system for projecting data on a user's view (sometimes referred to as a "heads-up display"), completely unrelated data may need to be transmitted to each eye.

BRIEF SUMMARY OF THE INVENTION

Embodiments of the present invention can generate independent multiple images of a single display screen that are focused by a lens and then directed along separate optical sub-paths by a splitter located near the focal point of the generated images. In one embodiment, a single display screen is illuminated from different directions producing multiple images of the screen that are then focused by the lens. The images are then split, in the reduced splitting volume created by the lens, into a plurality of sub-images that are transmitted to separate eyes of a user. These embodiments may utilize a symmetrical V-mirror splitter composed of two partially or fully reflective surfaces arranged around the focal point of the lens. The images are then reflected by the partially or fully reflective surfaces along separate optical sub-paths leading to the individual eyes of the users.

Other embodiments can generate multiple independent images of a display screen by illuminating the screen with sources of differing polarization. The images produced can then be split by an asymmetric V-mirror composed of a polarizing beam splitter surface and a fully reflective surface arranged near the focal point of the lens. The light from each source is reflected along a different optical sub-path.

Embodiments may also generate multiple images of a single display screen by illuminating a screen with a light source, polarizing the light reflected from the display, and then alternating the polarization in one of several directions. By alternating the direction of polarization, sub-images can be redirected along different optical sub-paths by an asymmetric V-mirror.

Some embodiments may also utilize diffusers on which images of the display screen are projected. Transition optics having a small numerical aperture may be used to project the real images onto the diffuser and eyepiece optics having a large numerical aperture can be used to transmit the images to the eyes of the user.

To generate different images for each eye of a user using one screen, embodiments of the present invention can interlace a plurality of data streams for display on the single display screen and link each data stream with one of the illumination sources. The interlaced data streams can then be displayed on the display screen while the display screen is illuminated with the linked sources. To generate separate images, the screen is illuminated by a particular source only when the display screen is displaying that source's linked data stream. Embodiments that generate multiple images using light polarization, may link each data stream with a polarization direction. When the display screen displays a data stream, the polarization direction linked to that data stream is used to send the screen image of that data stream along the appropriate sub-path.

The plurality of illumination sources used by various embodiments of the present invention may be broad-band light sources placed near the focal point of the display lens and illuminating the display screen by shining light through the V-mirror splitter. Other embodiments may use a plurality of narrow-band light sources arranged to simulate a broad-band light source. Further, embodiments may arrange the illumination sources adjacent to the optical axis of the system, and reflect the light from the sources using a partially-reflective surface interposed between the splitter and the display lens.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
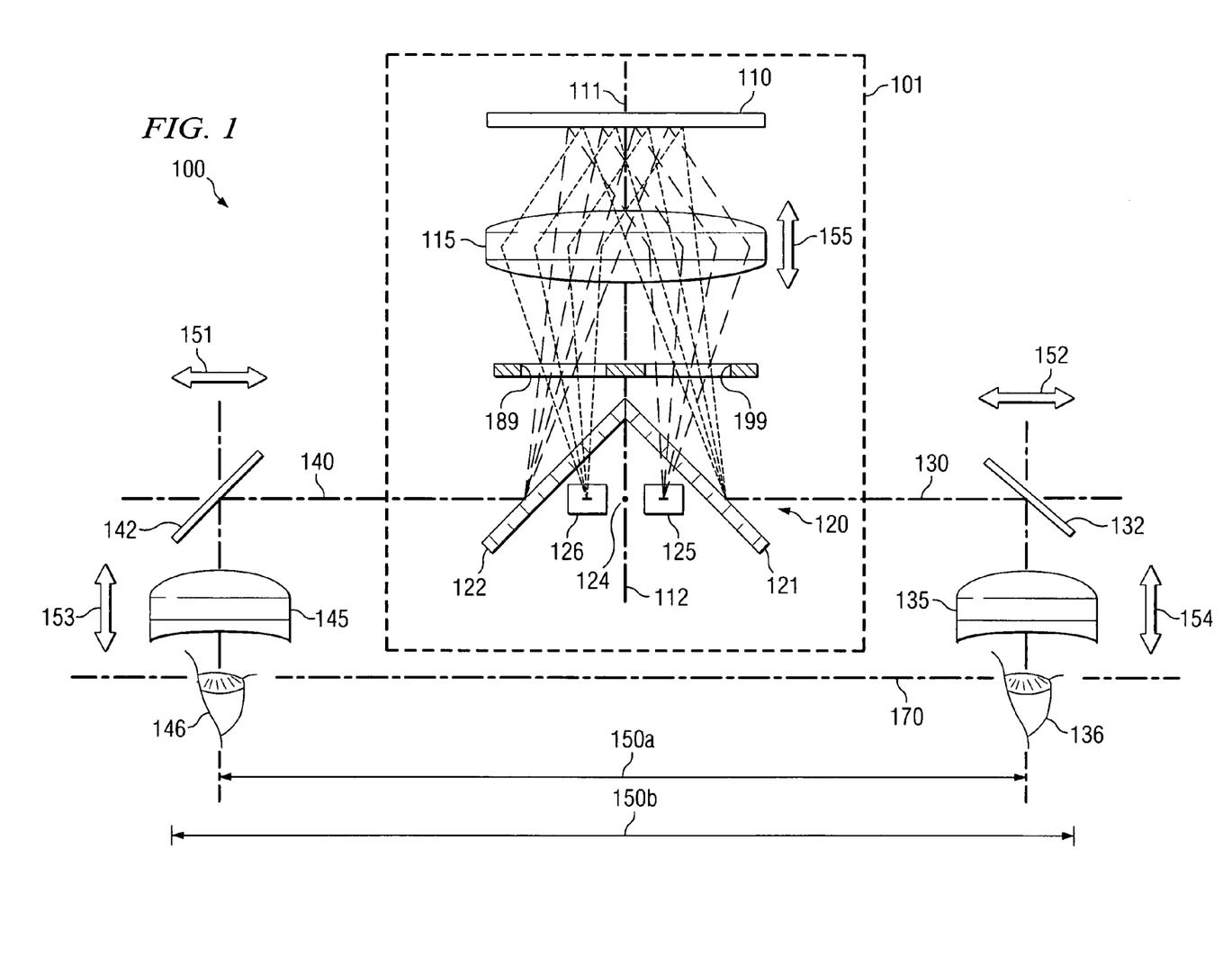
FIG. 1 illustrates a top view of head mounted device 100 arranged according to an embodiment of the present invention.

FIG. 1 illustrates a top view of head mounted device 100 arranged according to an embodiment of the present invention. Sub-image creation section 101, within device 100, creates a plurality of sub-images from a single image source. Display screen 110 can be any suitable apparatus operable to display a visual image of data using external illumination sources, such as a liquid crystal display (LCD) screen. Screen 110 is situated along a display axis 111, which, in the embodiment shown, is normal to the surface of screen 110 and perpendicular to facial plane 170 of a user. Display lens 115 is located along, and perpendicular to, optical path 112, and has display lens focal point 124. Display lens focal point 124 lies on optical path 112, and section 101 is arranged such that display lens focal point 124 lies within splitter 120. In embodiments using the arrangement of section 101, splitter 120 is a symmetric V-mirror composed of right partially-reflective surface 121 and left partially-reflective surface 122. Section 101 is arranged so that reflective surface 121 and reflective surface 122 share a common edge and are arranged symmetrically about display axis 111. Section 101 can thus generate two fully complete and independent images (referred to herein as sub-images) of display 110, each traveling along independent optical paths (referred to herein as sub-paths).

Included in section 101 are a right light source 125 and a left light source 126 lying in a line with display lens focal point 124 and arranged symmetrically about display axis 111. Light from sources 125 and 126 pass through surfaces 121 and 122, are collimated by display lens 115, and illuminate screen 110. In the embodiment of FIG. 1, the collimated light beams generated will be slightly skewed with respect to optical axis 111. The illumination of screen 110 by right light source 125 creates a display left-eye sub-image that is focused by lens 115 to impact reflective surface 122, which redirects the left-eye display sub-image down optical sub-path 140. Similarly, the illumination of screen 110 by left light source 126 creates a right-eye display sub-image that is focused by lens 115 to impact reflective surface 121, which redirects the right-eye display sub-image down optical sub-path 130.

The left-eye sub-image will follow optical sub-path 140 and be channeled to left-eye 146 of a user. Placed along optical sub-path 140 is left-eye reflector 142, which is a fully reflective surface arranged to redirect left-eye optical sub-path 140 by 90° and into left eyepiece optics 145. The right-eye sub-image will follow optical sub-path 130 and be channeled to right-eye 136 of a user. Placed along optical sub-path 130 is right-eye reflector 132, which is a fully reflective surface arranged to redirect right-eye optical sub-path 130 by 90° and into right eyepiece optics 135. Right eyepiece optics 135 and left eyepiece optics 145 can be composed of single or multiple lenses designed to appropriately magnify a right-eye sub-image for viewing by right-eye 136 of the user and a left-eye sub-image for viewing by left-eye 146 of the user, respectively. Some embodiments may utilize diffusers on which real images are created. Right and left eyepiece optics 135, 145 may then be used to magnify the images for viewing by the user. For a large viewing angle (e.g. 36°), the real images should be created after reflectors 132, 142 and very near right and left eyepiece optics 135, 145.

Eyepiece optics 135 and 145 are adjustable single lenses, but other embodiments may use any arrangement that appropriately magnifies a right-eye sub-image and a left-eye sub-image for viewing by right-eye 136 and left-eye 146, respectively. Further, although reflectors 132, 142 of device 100 are depicted as mirrors, and surfaces 121, 122 are depicted as partially-reflective surfaces, embodiments are not limited to the use of mirrors or partially-reflective surfaces for redirecting an optical path or sub-path. Rather, prisms, polarizing beam splitters, or any other suitable arrangements can be used for redirecting an optical path or sub-path.

Device 100 is also capable of adjusting for the varying IPDs of different users through the synchronized movements of optical elements. Right eyepiece optics 135 and left eyepiece optics 145 can shift through movements 152 and 151 respectively to create IPD 150a and IPD 150b. Section 101 can shift through movement 155. When IPD distance 150a is changed to IPD 150b, section 101 is simultaneously shifted toward plane 170 in movement 155 (downwards in the view of FIG. 1). When IPD 150b is changed to 150a, section 101 is simultaneously shifted away from plane 170 (upwards in the view of FIG. 1). These synchronized movements allow device 100 to adjust to accommodate for the entire range between IPD 150a and 150b while maintaining constant lengths between reflectors 121, 122 and eyepiece lenses 135, 145 along sub-paths 130 and 140, respectively. Device 100 is also capable of diopter correction through additional adjustments of movement 153 of left eyepiece optics 145 and movement 154 of right eyepiece optics 135.

Two off axis aperture stops 189, 199 may be placed between display lens 115 and splitter 120. The aperture stop, imaged in proximity to the viewer's pupil, is sized appropriately for the width necessary to cover the user's pupil movement when viewing the corners of the virtual screen. To accommodate a wide range of a viewer's pupil movement, the size of the aperture should be 2-3 times larger than is necessary for transferring the spatial frequency range required by the resolution of display screen 110. For homogenous illumination of aperture stops 189, 199, left and right light sources 125, 126 should be of extended (non point source) size.

Screen 110 of FIG. 1 can transmit identical images of display screen 110 to both the right-eye and the left-eye of a user simultaneously. Identical sub-images of display screen 110 will travel along optical sub-paths 130 and 140 when both light sources 125 and 126 are used to simultaneously illuminate screen 110. If however, light sources 125 and 126 alternately illuminate screen 110, one set of images can be sent to the left-eye of user, while a different set of images can be sent to the right-eye of the user using the same screen.

Figure 2:
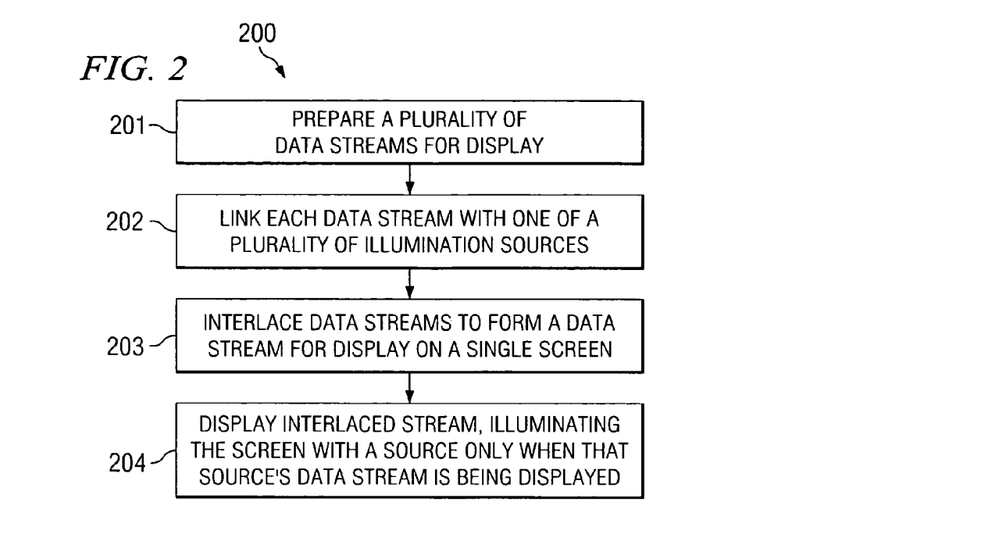
FIG. 2 is a flow diagram arranged according to an embodiment of the present invention.

FIG. 2 is a flow diagram arranged according to an embodiment of the present invention. Following diagram 200, a head mounted device, such as device 100, can be used to transmit different images to the left-eye of a user than are transmitted to the right-eye, while using a single screen. Typically, the screens of head mounted devices, such as screen 110 of FIG. 1, display data conveyed as data streams. In FIG. 2, diagram block 201 prepares multiple data streams for display on a screen. For example, one data stream may be prepared for viewing by a user's left-eye and a second data stream can be prepared for viewing by a user's right-eye. In block 202, each data stream is linked with one of a plurality illuminating sources that exist for an appropriately arranged head mounted display. For example, using device 100 of FIG. 1, a data stream prepared for viewing by the right-eye of a user could be linked with left light source 126, and a data stream prepared for viewing by a left-eye of a user could be linked with right light source 125. Returning to FIG. 2, block 203 interlaces the multiple data streams so that they can be displayed on a single screen. In block 204, the interlaced streams are displayed on a screen, while the screen is alternately illuminated by the light sources linked with the data streams being displayed. For example using device 100, when the data stream to be viewed by right-eye 136 is being displayed by screen 110, screen 110 would be illuminated by left light source 126. When the data stream to be viewed by the left-eye of the user is being displayed by screen 110, screen 110 would be illuminated by right light source 125.

Figure 3:
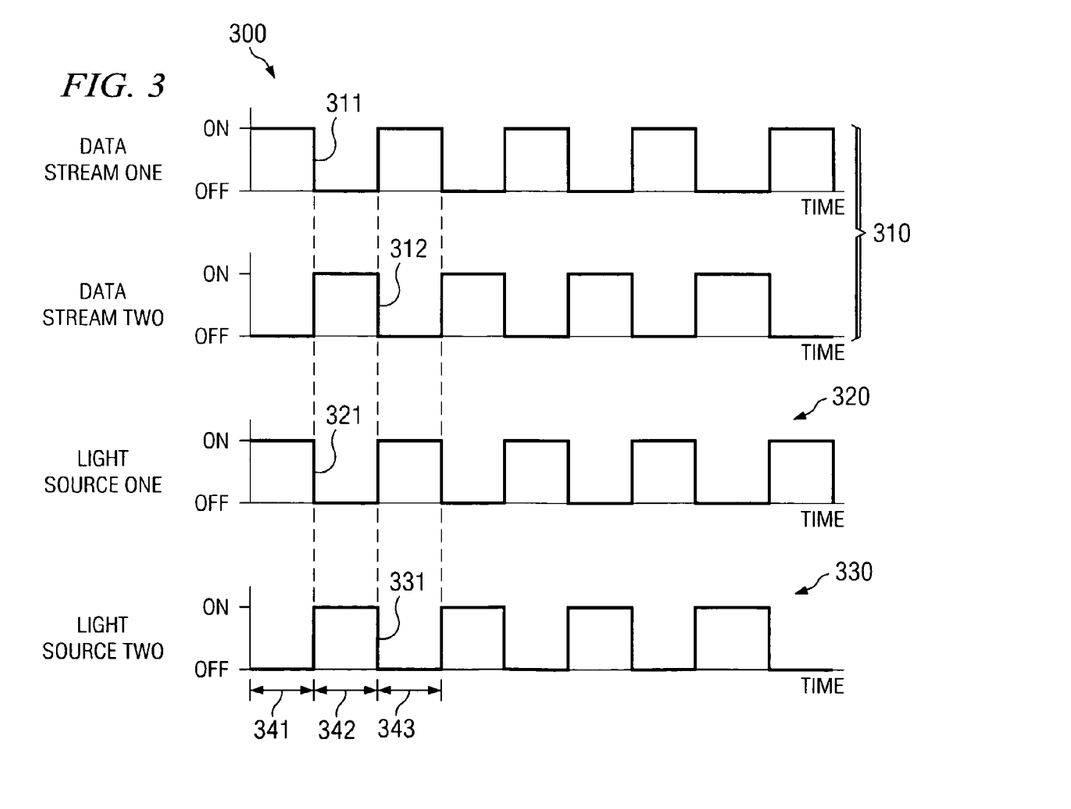
FIG. 3 graphically illustrates an interlacing of data streams and a linking of light sources according to an embodiment of the present invention.

FIG. 3 graphically illustrates an interlacing of data streams and a linking of light sources according to an embodiment of the present invention. Graph set 310 comprises a graphical representation of data stream 311 and data stream 312. When used in a manner such as the one described above, an embodiment can interlace data stream 311 and data stream 312 by alternately sending to a display, discrete time segments of each data stream. For example, during time segment 341, a portion of data stream 311 is sent to the screen for display. During time segment 342, a portion of data stream 312 is sent to the screen for display. Graph 320 shows the timing of a light source linked with data stream 311. When an embodiment is sending a segment of data stream 311 to a display, such as time segment 341, the screen of a head mounted display would be illuminated by the light source linked to this data stream, shown in graph 320 as source 321. Graph 330 shows the timing of light source linked with data stream 312. When an embodiment is sending a segment of data stream 312 to a display, such as time segment 342, the screen of a head mounted display would be illuminated by the light source linked to this data stream, shown in graph 330 as source 331.

The embodiments of the present invention are not limited to stereoscopic technique as depicted in FIGS. 2 and 3. Any pattern of interlacing a plurality of signals may be used. In practice, the specific pattern, the number of data streams, and the number of light sources will be dependent on the application. For example, many LCDs use color sequential illumination, namely red, green, and blue light pulses are sent in sequential LCD images. To accommodate this, embodiments may employ light sources 125 and 126 that utilize separately controllable red, green, and blue sources. Further arrangements of other embodiments for generating multiple images of display screen 110, such as illuminating display screen 110 with light of alternating polarization directions, may require adjustment to the above described procedures.

Figure 4:
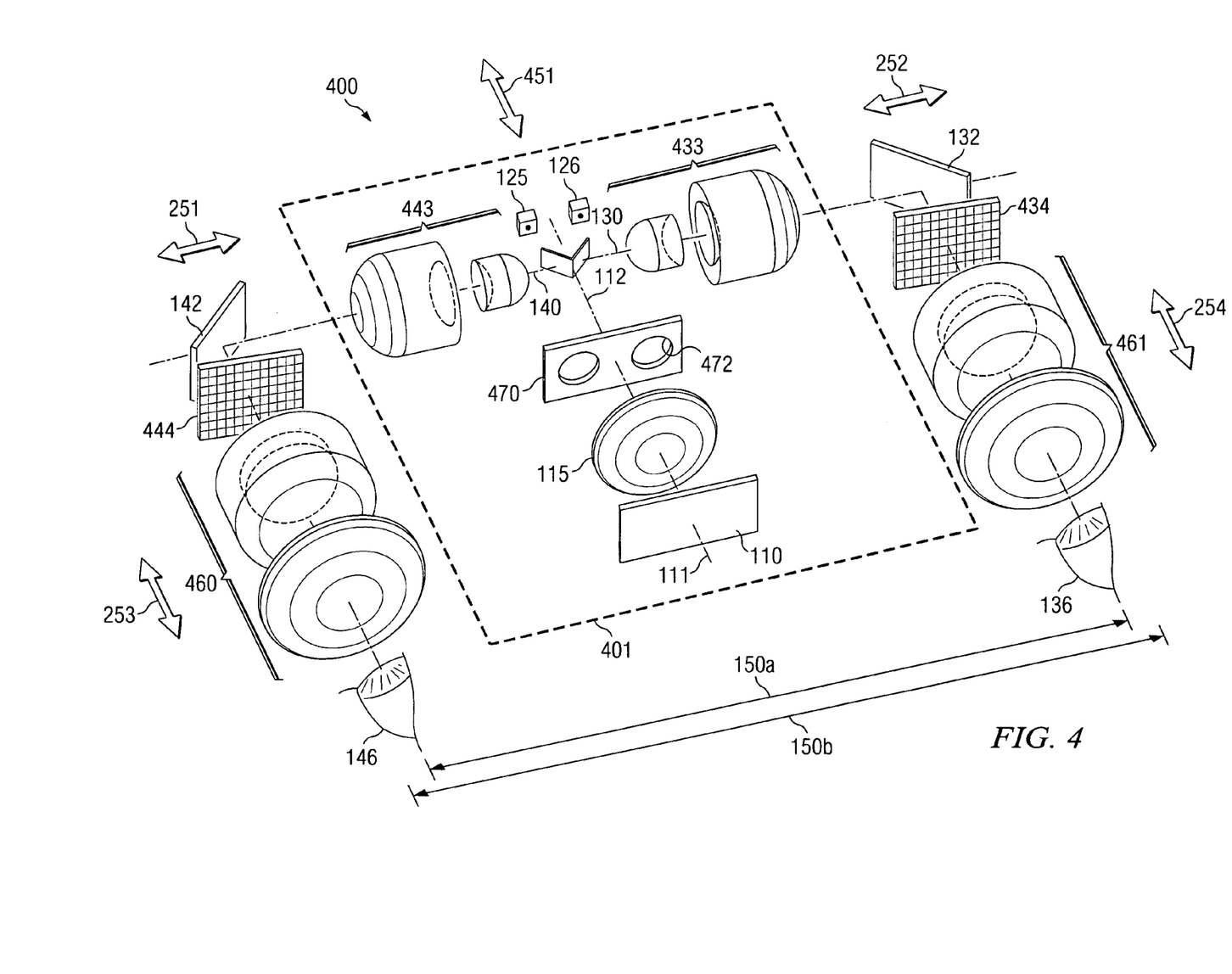
FIG. 4 is a prospective view of a head mounted device arranged according to an embodiment of the present invention.

The embodiments of the present invention are not limited to head mounted device arrangements such those depicted in FIG. 1. FIG. 4 is a prospective view of a head mounted device arranged according to an embodiment of the present invention. Head mounted device 400 includes section 101, as described in relation to FIG. 1, which operates to split a display image of display 110 into a left-eye sub-image traveling along left-eye optical sub-path 140 and a right-eye sub-image traveling along right-eye optical sub-path 130. For device 400, left-eye transition optics 443 are placed along left-eye optical sub-path 140 to adjust a left-eye sub-image before it strikes left-eye reflector 142. Left-eye reflector 142 reflects a left-eye sub-image toward left eyepiece 460. Left eyepiece 460 is composed of compound optics. A left-eye sub-image strikes the left-eye diffuser 444 and creates a real image on the surface. The left eyepiece compound optics will create a magnified virtual image from this real image appropriately for left-eye 146.

Similarly, a right-eye sub-image follows the right-eye optical sub-path 130 into right-eye transition optics 433. The right-eye transition optics 433 adjusts the right-eye display sub-image appropriately for reflection by right-eye reflector 132 into right eyepiece 461. Right eyepiece 461 is composed of compound optics. A right-eye sub-image strikes right-eye diffuser 434 and creates a real image. A magnified virtual image is created from the real image by compound optics for right-eye 136. Device 200 is capable of diopter correction through movement 253 of the compound optics 460 and of movement 254 of the compound optics 461.

Two off axis aperture stops 470, 472 may be placed between display lens 115 and splitter 420 to determine the spatial frequency content of transition optics 433, 443. Consequently the size of the aperture stop in the embodiment of FIG. 4 is determined by the display resolution, and thus smaller apertures, than those of FIG. 1, may be used in the embodiment of FIG. 4.

Device 400 is also capable of IPD adjustment through the synchronized movements of separate optical blocks. IPD 150 can be shortened by shifting left eyepiece 460 to the right with movement 251, and eyepiece 461 to the left with movement 252. For the embodiment of FIG. 4, the length of optical sub-path 140 between transition optics 443 and diffuser 444, and the length between diffuser 444 and eyepiece 460 should be kept constant. Thus, as eyepiece 460 moves to the right in movement 251, diffuser 444 and left-eye reflector 142 will stay in a fixed position as central block 401, including lens 443, is moved perpendicularly away from the facial plane. Likewise, the length of optical sub-path 130 between transition optics 433 and diffuser 434, and the length between diffuser 434 and eyepiece 461 should be kept constant. Thus, as eyepiece 461 moves to the left in movement 252, diffuser 434 and right-eye reflector 132 will stay in a fixed position as central block 401, including lens 443 is moved in movement 451 perpendicularly away form the facial plane.

Embodiments of the present invention may include aperture stop 470. Aperture stop 470 allows light to pass through openings 471 and 472. Openings 471, 472 may be alternatively arranged as shutters which could then be used to block propagation of light reflected form display screen 110. Using such shutters, device 400 can control whether an image is sent to either eye of a user in a manner that is easily adaptable to the stereoscopic technique of FIGS. 2 and 3. By alternating shuttering openings 471, 472, and by linking this shuttering to the display of specific data streams, an embodiment could transmit to each eye only selected data streams.

In the embodiment of FIG. 4, transition optics 433, 443 are used to transfer the display image to diffusers 434, 444 with a magnification of approximately 1. The numerical aperture of the incident real images is then increased by diffusers 434, 444. Eyepieces 460, 461 then project real images created on diffusers 434, 444 into eyes 136, 146 as magnified virtual images.

Figure 5:
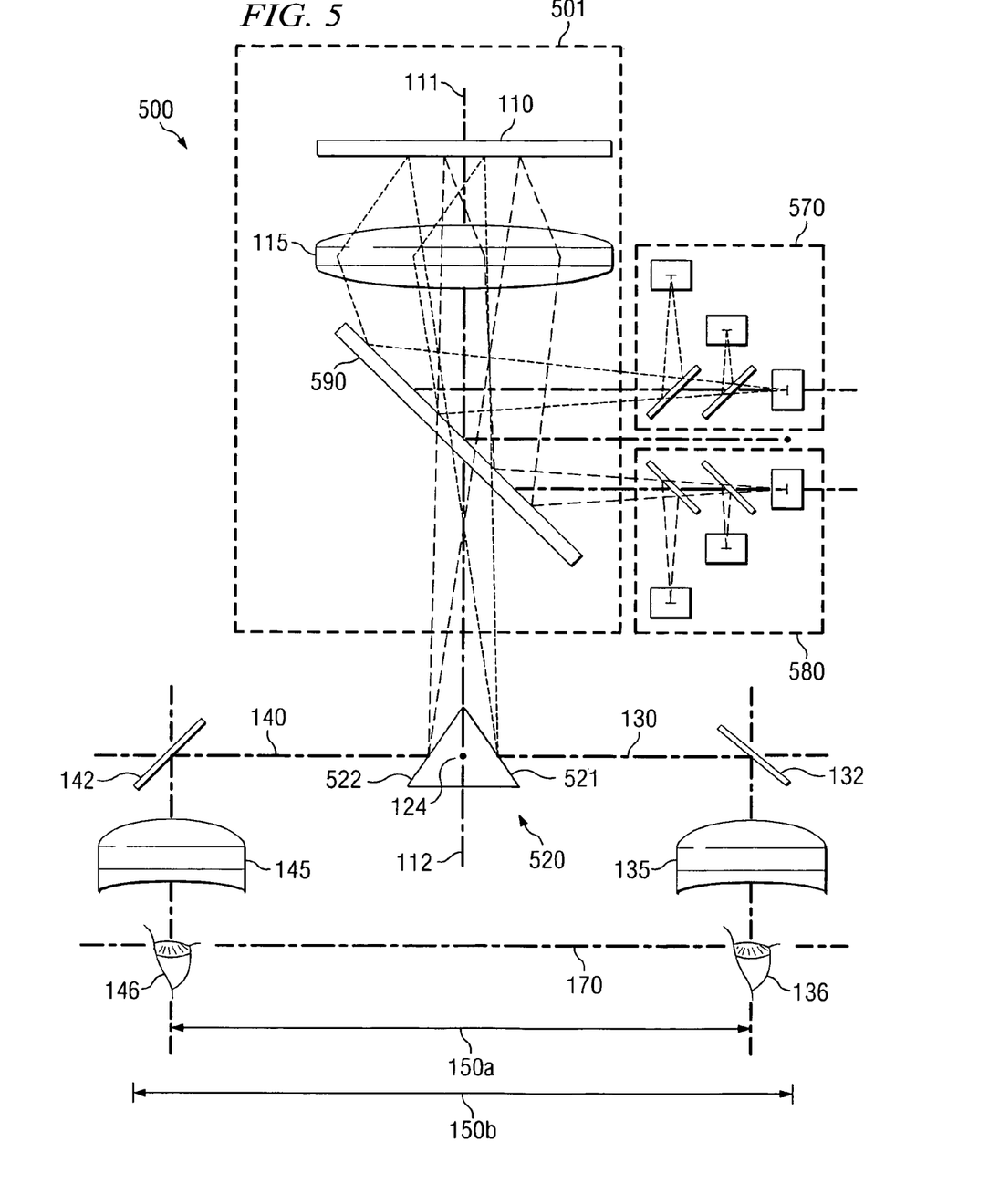
FIGS. 5 and 5A are top down views of a head mounted device arrange according to an embodiment of the present invention.
Figure 5A:
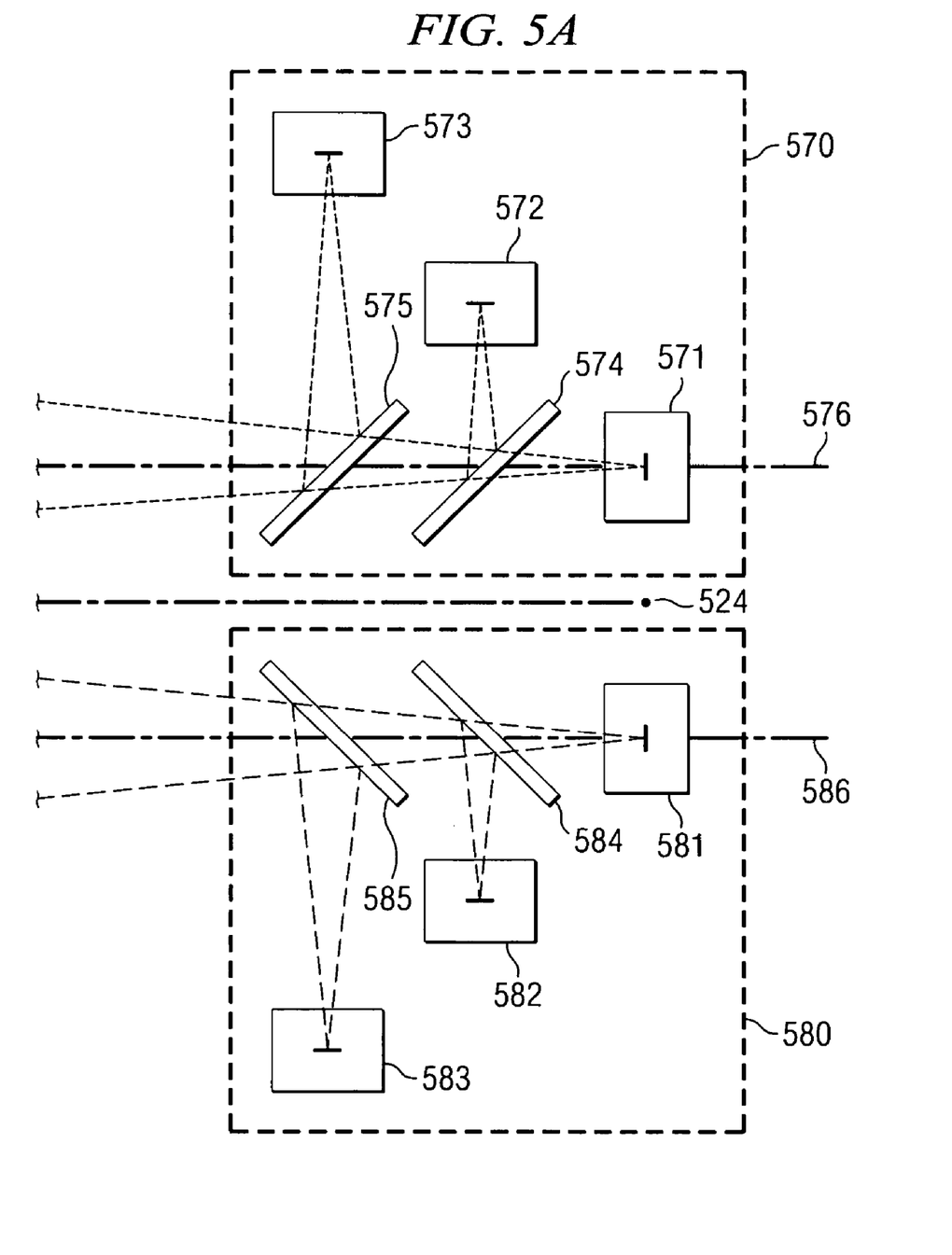

The embodiments of the present invention are not limited to arrangements utilizing splitter section 101. FIGS. 5 and 5A are top down views of a head mounted device arranged according to an embodiment of the present invention. Device 500 includes sub-image creation section 501. Like section 101, section 501 generates a left-eye display sub-image that follows optical sub-path 140 and a right-eye display sub-image following optical sub-path 130. Screen 110 of section 501 is advantageously illuminated by collimated light from light source 570 and light source 580 arranged to project light about source light path 576 and source light path 586, respectively. Light source 570 is comprised of blue source light 571 arranged along the source light path 576, preferably in a position at or near reflective focal point 524 of display optics 115. Blue source light 571 may be any light source capable of producing blue light, such as Nichia NSCx100 series light emitting diode (LED). Light from blue source 571 passes through a first color filter 574 arranged at an appropriate angle to source light path 576 and selected to pass blue light and to reflect green light. Green source 572 is placed adjacent to source light path 576 and arranged to reflect light off of color filter 574 in a way that simulates placing green source 572 in the same location as blue source 571. Blue light and the reflected green light follow source light path 576 passing through second color filter 575 arranged at an appropriate angle to source light path 576. Second color filter 575 is selected such that it passes blue and green light, but reflects red light. Red source 573 is placed adjacent to source light optical path 576 and arranged to reflect light off of second color filter 575 in a way that simulates placing red source 573 in the same location as blue source 571. Blue light, reflected green light, and reflected red light then follow source light optical path 576 and are reflected by source light reflector 590. In the depicted embodiment, source light reflector 590 can be a polarizing reflector arranged about display axis 111 and along optical path 112. The combined blue, green, and red light is polarized and reflected off of source light reflector 590, through display optics 115. In the depicted embodiment, display optics 115 is a lens selected to have a focal point of 124 (and a reflected focal point 524). When passed through display optics 115, the combined blue, green, and red light illuminates display 110 with a collimated beam that is slightly skewed relative to axis 111.

Light source 580 is comprised of blue source light 581 arranged along the source light path 586, preferably in a position at or near reflective focal point 524 of display optics 115. Blue source light 581 may be any light source capable of producing blue light, such as Nochia NSCx100 series light emitting diode (LED). Light from blue source 581 passes through a first color filter 584 arranged at an appropriate angle to source light path 586 and selected to pass blue light and to reflect green light. Green source 582 is placed adjacent to source light path 586 and arranged to reflect light off of color filter 584 in a way that simulates placing green source 582 in the same location as blue source 581. Blue light and the reflected green light follow source light path 586 passing through second color filter 585 arranged at an appropriate angle to source light optical path 586. Second color filter 585 is selected to pass blue and green light, but reflect red light. Red source 583 is placed adjacent to source light path 586 and arranged to reflect light off of second color filter 585 in a way that simulates placing red source 583 in the same location as blue source 581. Blue light, reflected green light, and reflected red light then follow source light path 586 and are reflected by source light reflector 590. In the depicted embodiment, source light reflector 590 can be a polarizing reflector arranged about display axis 111 and along optical path 112. The combined blue, green, and red light is polarized and reflected off of source light reflector 590, through display optics 115. In the depicted embodiment, display optics 115 is a lens selected to have a focal point of 124 (and a reflected focal point 524). When passed through display optics 115, the combined blue, green, and red light illuminates display 110 with a collimated beam that is slightly skewed relative to axis 111.

Section 501 of device 500 further comprises a prism splitter 520 oriented about display lens focal point 124. Section 501 depicts prism splitter 520 arranged with focal point 124 at its center, but the embodiments are not restricted to this arrangement. If light sources 580 and light sources 570 are arranged closer to optical path 112 than is reflected focal point 524, splitter 520 should be arranged farther away from display 110 than is focal point 124. Conversely, if light sources 580 and 570 are arranged farther from optical path 112 than is reflected focal point 524, splitter 520 should be arranged closer to display 110 than is focal point 124. Thus, the embodiments of the present invention are not limited to arrangements wherein splitter 520 of FIG. 5 (or splitter 120 of FIG. 1, or splitter 420 of FIG. 4) is placed near the focal point of display lens 115, but may be arranged at any point coinciding with a reduced splitting volume created by a display image focused by an optic such as lens 115. Light from source 570, is reflected from screen 110, forms an image of screen 110 that is focused by display lens 115, and is reflected off of prism splitter face 521 and along optical sub-path 130 as a right-eye sub-image. Light from source 580, is reflected from screen 110, forms an image of screen 110, is focused by display lens 115, and is reflected off of prism splitter face 522 and along optical sub-path 140 as a left-eye sub-image.

The left-eye sub-image will follow optical sub-path 140 and be channeled to left-eye 146 of a user. Placed along optical sub-path 140 is left-eye reflector 142, which is a fully reflective surface arranged to redirect left-eye optical sub-path 140 by 90° and into left eyepiece optics 145. The right-eye sub-image will follow optical sub-path 130 and be channeled to right-eye 136 of a user. Placed along optical sub-path 130 is right-eye reflector 132, which is a fully reflective surface arranged to redirect right-eye optical sub-path 130 by 90° and into right eyepiece optics 135. Right eyepiece optics 135 and left eyepiece optics 145 can be of single or multiple lenses designed to appropriately magnify a right-eye sub-image for viewing by right-eye 136 of the user and a left-eye sub-image for viewing by left-eye 146 of the user, respectively.

Eyepiece optics 135 and 145 are adjustable lenses, but other embodiments may use any arrangement that appropriately magnify a right-eye sub-image and a left-eye sub-image for viewing by right-eye 136 and left-eye 146, respectively. Further, although reflectors 142, 132 of device 500 are depicted as mirrors, embodiments are not limited to the use of mirrors for redirecting an optical sub-path. Rather, prisms, partially-reflective surfaces, polarizing beam splitters, or any other suitable arrangements can be used for redirecting an optical sub-path.

Device 500 is also capable of correcting for the varying IPD of different users. Device 500 can adjust for IPD 150 of a particular user by movement of left eyepiece optics 145, and by movement of right eyepiece 135, and simultaneously moving the central part of the optics perpendicularly to the facial plane. Device 500 is also capable of diopter correction through movement of left eyepiece optics 135 and movement of right eyepiece optics 145.

Figure 6:
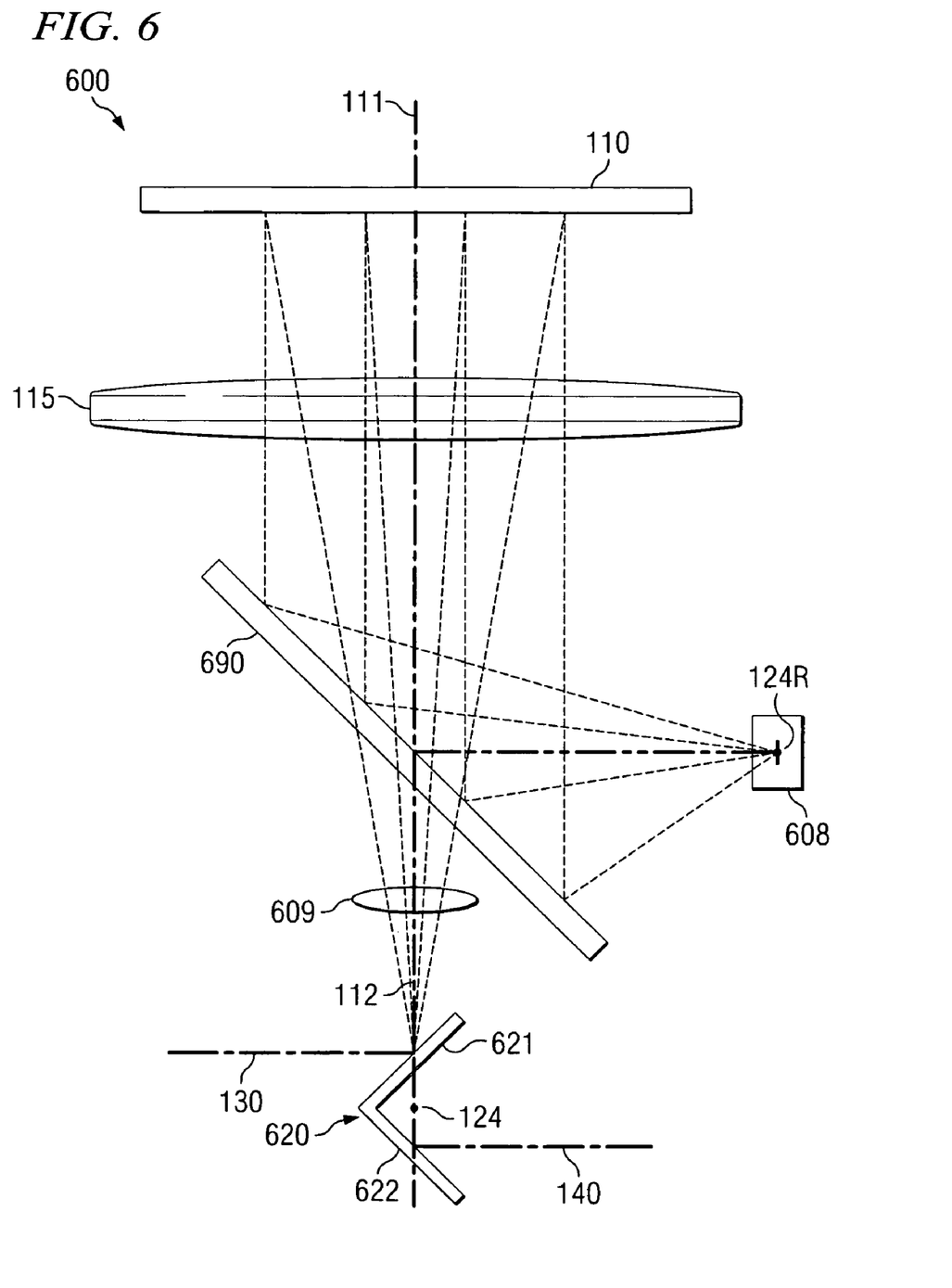
FIG. 6 illustrates a top down view of a portion of a head mounted display arranged according to an embodiment of the present invention.

Embodiments of the present invention are not limited to the creation of multiple independent images of a display screen by the illumination of a display screen from multiple directions, but rather may use any method of generating multiple images from a single display. FIG. 6 illustrates a top down view of a portion of a head-mounted display arranged according to another embodiment of the present invention. Device 600 includes source 608, placed at reflective focal point 124R, the light of which is reflected and polarized by polarization beam splitter 690. The light from source 608 is collimated by lens 115, reflected by display 110, and propagated along optical path 112. Arranged along optical path 110 is a polarization adjustment unit such as polarization rotator 609 which is able to rotate the polarization of the light from source 608. Polarization rotator is able to switch the direction f linear light polarization of the exit light between two or among multiple directions. The embodiments of the present invention are not limited to polarization rotators nor to the use of linear polarized light. Rather, the embodiment of the present invention may use linearly, circularly, elliptically, or any other form of polarized light, and may use any appropriate polarization adjustment unit that allows an embodiment to differentiate between sub-images. Splitter 620 is an asymmetric V-mirror splitter arranged about focal point 124 of lens 115. Surface 621 of splitter 620 is polarization beam splitter and surface 622 is a fully reflective surface.

To transmit an image to the left eye of a user, device 600 selects the state of polarization rotator 609 that causes the light of source 608 to be reflected along optical sub-path 130 by surface 621. To transmit an image to the right eye of a user, device 600 selects the state of polarization rotator 609 that would cause the light of source 608 to be passed by surface 621 and thus reflected by surface 622 along optical sub-path 140. The embodiment of FIG. 6 is also easily adapted to the stereoscopic technique of FIGS. 2 and 3. The data streams displayed by display screen 110 could be interlaced in a manner similar to that described above and linked with the state of polarization rotator 609.

Figure 7:
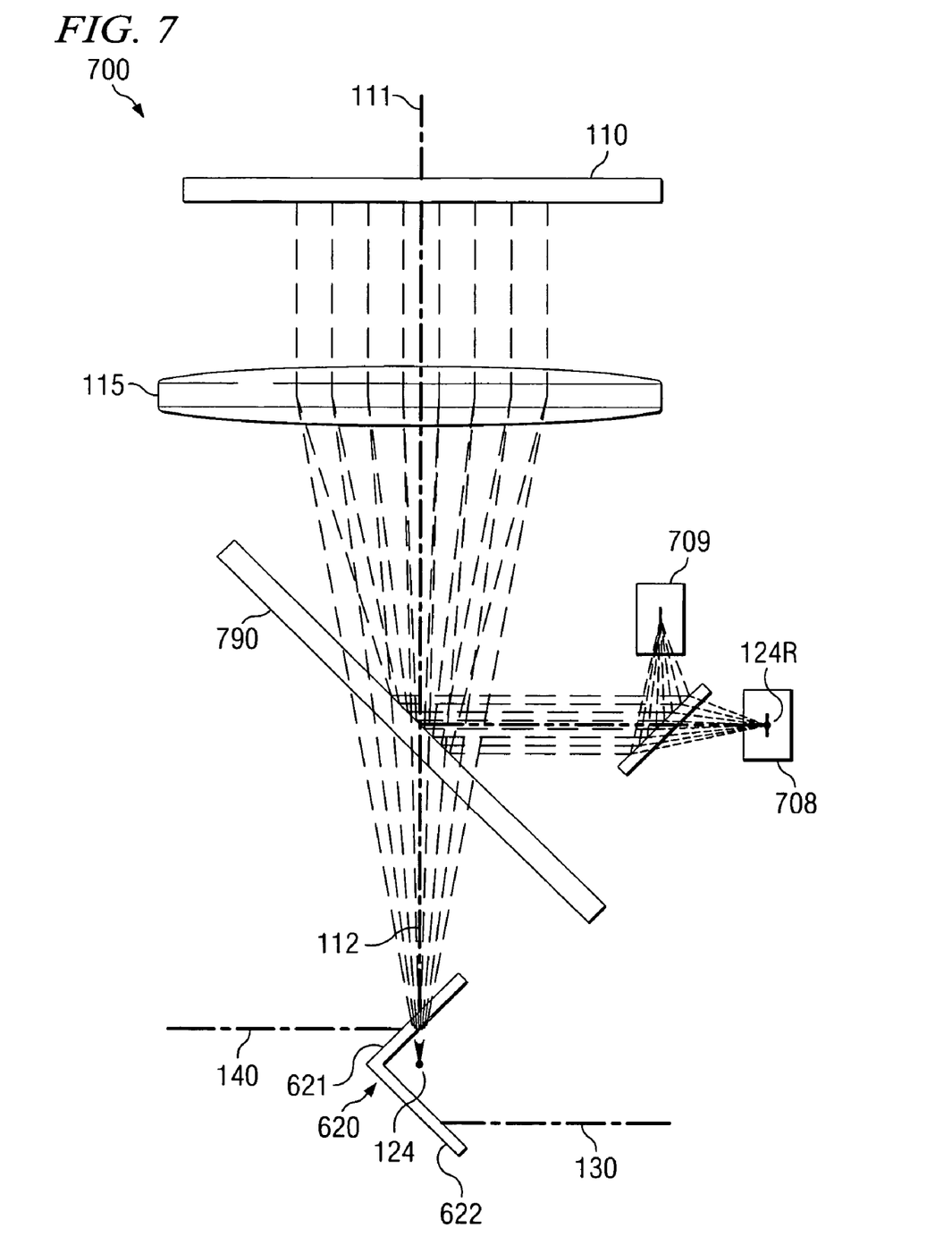
FIG. 7 illustrates a top down view of a portion of a head mounted display arranged according to an embodiment of the present invention.

Embodiments that create multiple images of a display screen utilizing polarization, are not limited to the arrangement of FIG. 6. FIG. 7 illustrates a top down view of a portion of a head mounted display arranged according to another embodiment of the present invention. Device 700 includes sources 708 and 709 arranged to illuminate display screen 110 with two co-incident beams of orthogonal polarizations. Source 708 propagates through a polarization beam splitter. Source 709 is reflected by a polarization beam splitter. Thus, display screen 110 is illuminated by collimated light from source 708 polarized in one direction, and illuminated by collimated light from source 709 polarized in a second direction. Surface 790 is a partially reflective surface that has no affect on the polarization of the light from source 708, 709.

Once reflected from display screen 110, light from sources 708, 709 is focused by lens 115 to point 124. Splitter 620 is an asymmetric V-mirror splitter, in which 621 is a polarization beam splitter and 622 is a full mirror, and surface 621 will reflect the light of source 709 along optical sub-path 130 while passing the light of source 708 to be reflected from surface 622. The embodiment of FIG. 7 is easily adapted to the stereoscopic technique of FIGS. 2 and 3. The data streams displayed by display screen 110 could be interlaced in a manner similar to that described above and then linked with source 708 or source 709. By alternately illuminating sources 708, 709 in time with display of interlaced data streams, different data may be transmitted to each eye of a user.

Although the above embodiments are described using non-skew illumination, some display types (for example, a digital light processing (DLP) or other micro mirror display) require skewed light beam illumination. To accommodate such display screens, the embodiments of the present invention can be easily adapted to off axis positions. For example, 708, 709 can be arranged in off axis positions to illuminate two co-incident skewed beams of orthogonal polarization.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method of generating multiple independent images from a single display screen, said method comprising:
   illuminating said display screen with a plurality of sources to create a plurality of display sub-images; and
   focusing said display sub-images with a display lens, wherein each said display sub-image is redirected along one of a plurality of sub-paths from a point proximate to the focal point of said display sub-images;
   wherein a first source illuminates said display screen with light having a first polarization, and wherein a second source illuminates said display screen with light having a second polarization.

2. The method of claim 1 wherein said sub-path of said display sub-image is associated with said polarization of said source creating said display sub-image.

3. A method of generating multiple independent images from a single display screen, said method comprising:
    illuminating said display screen with a plurality of light beams to create a plurality of sub-images, wherein at least two said beams have different polarizations; and
    focusing said sub-images with a lens, wherein said each said sub-image is redirected along an independent sub-path from a point proximate to the focal points of said sub-images.

4. The method of claim 3 wherein an asymmetrical V-mirror redirects each said display sub-image along one of said sub-paths.

5. The method of claim 3 wherein said lens is glass.

6. The method of claim 3 wherein said sub-path of said sub-image is determined by the polarization of light creating said sub-image.

7. A method of transmitting different images to each eye of a user using a single display screen, said method comprising:
    interlacing a plurality of data streams, wherein each said data stream is linked to a direction of light polarization of incident light;
    creating a plurality of sub-images of said display screen by displaying said interlaced data streams and illuminating said display screen, wherein said sub-images are focused by a lens located proximate to said display screen; and
    redirecting each said sub-image to one of a plurality of sub-paths from a point proximate to the focal point of said sub-images.

8. The method of claim 7 wherein said incident light is linearly polarized, circularly polarized, or elliptically polarized.

9. The method of claim 7 wherein a first data stream is linked with light polarized in a first direction and a second data stream is linked with light polarized in a second direction.

10. The method of claim 9 wherein said display screen is illuminated by light polarized in said first direction when said first data stream is displayed, and said display screen is illuminated by light polarized in said second direction when said second data stream is displayed.

11. The method of claim 9 wherein light reflected from said display screen is polarized in said first direction when said first data stream is displayed, and light reflected form said display screen is polarized in said second direction when said second data stream is displayed.

12. The method of claim 7 wherein said redirecting comprises:
    focusing each said sub-image to a focal point of said lens; and
    arranging an asymmetrical V-mirror proximate to said focal point.

13. The method of claim 7 wherein said lens is glass.

14. The method of claim 7 wherein each sub-path is intended for viewing by a specific eye of a user.

15. The method of claim 7 wherein said data streams generate a three-dimensional image when viewed by the eyes of said user.

16. The method of claim 7 wherein said sub-path along which said sub-image is transmitted depends upon said polarization of the light creating said sub-image.

17. A head mounted display for generating images comprising:
    means for illuminating a display screen with light beams of at least two different polarizations;
    means of focusing said light beams; and
    means proximate to the focal points of said sub-images for redirecting each said sub-image along one of a plurality of sub-paths.

18. The head mounted display of claim 17 further comprising:
    light from a source that is incident upon said display screen and polarized in a first direction thereby creating a first sub-image; and
    light from a source that is incident upon said display screen and polarized in a second direction thereby creating a second sub-image.

19. The head mounted display of claim 17 further comprising:
    a polarization beam splitting surface proximate to a focal point of said first sub-image and positioned to redirect light reflected from said display screen along a first sub-path; and
    a reflective surface proximate to said focal point and positioned to redirect light reflected from said display screen along a second sub-path.

20. The head mounted display of claim 19 wherein light polarized in said first direction is redirected along said first sub-path to a first eye of a user and light polarized in said second direction is redirected along said second sub-path to a second eye of a user.

21. The head mounted display of claim 19 wherein a first and a second said data stream are alternately displayed on said display screen, wherein said display screen is illuminated by said light from said first polarized direction when said first data stream is displayed, and wherein said display screen is illuminated by light from said second polarized direction when said second data stream is displayed.

22. A system for generating multiple images, said system comprising:
    a display screen illuminated by at least one light source;
    a lens that focuses light reflected from said display screen;
    a beam splitter placed proximate to the focal point of light from said at least one light source, and
    a plurality of light sources, wherein such said source illuminates said display screen with light of different polarization.

23. The system of claim 22 wherein said display screen displays a plurality of data streams, wherein each said data stream is linked with one of said light sources, and wherein said display screen is illuminated by each said source only when said data stream linked with said source is displayed.

* * * * *